3,751,325
APPARATUS FOR THE MANUFACTURE OF CORRUGATED BOARD
Ake Evald Edkvist, 3 Rosenvagen, Staffanstorp, Sweden
Filed Aug. 28, 1970, Ser. No. 67,770
Int. Cl. B31f 1/22; B32b 31/04
U.S. Cl. 156—550                                    2 Claims

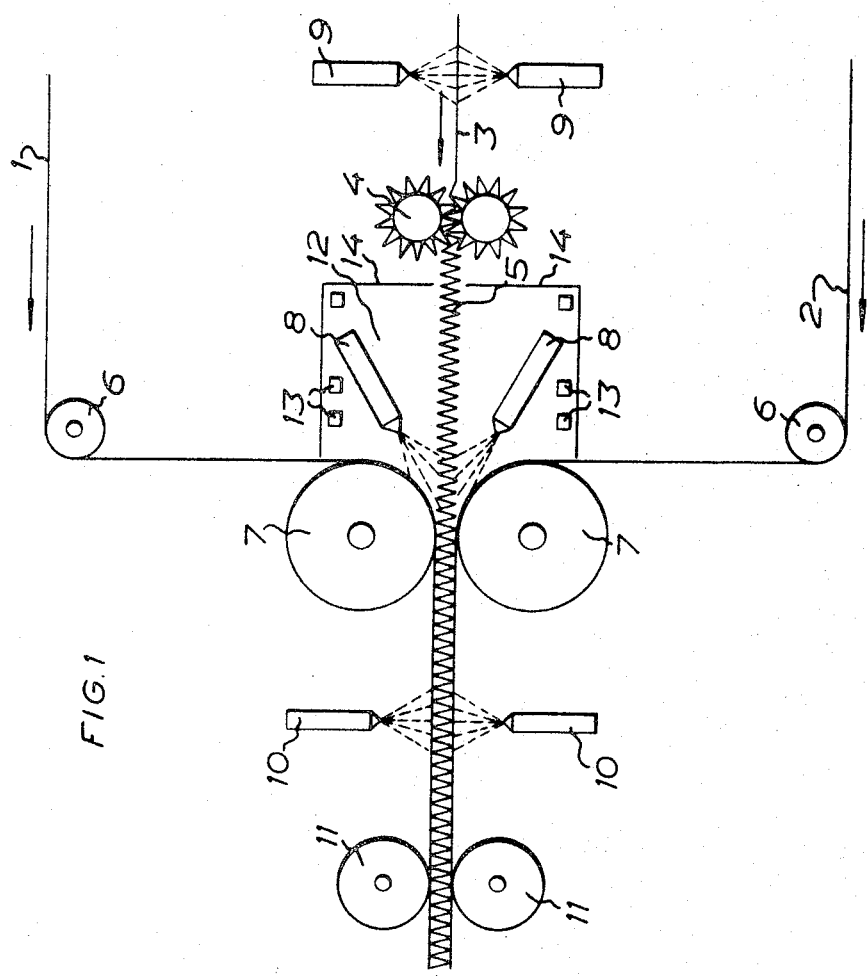

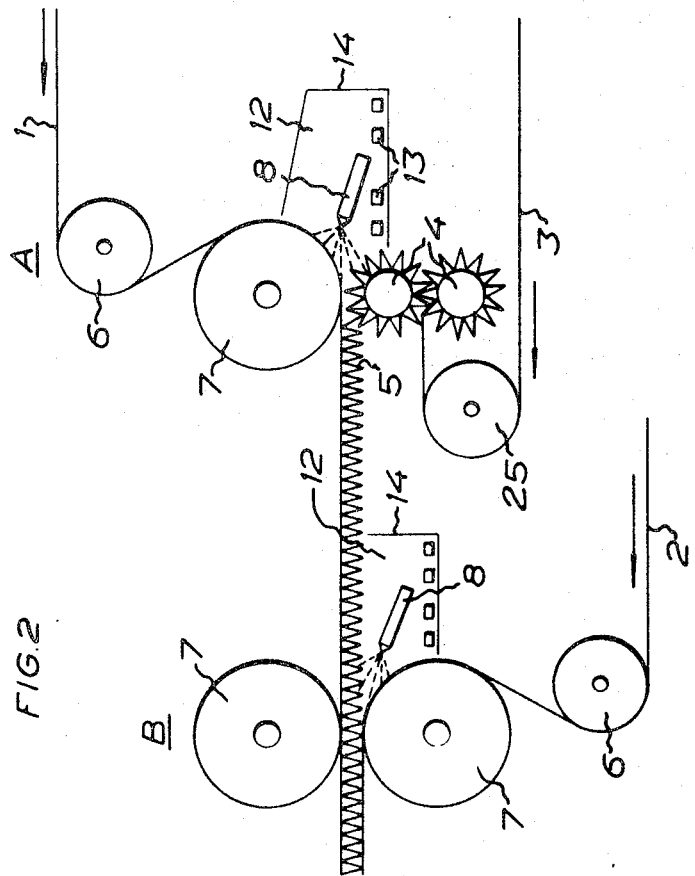

ABSTRACT OF THE DISCLOSURE

A method and an apparatus for the manufacture of corrugated board from at least one liner and one corrugated medium comprises joining the layers together as they run between rolls which rotate about their longitudinal axes. To permit a high speed of manufacture and to ensure very low consumption of material serving adhesively to bond the layers of the corrugated board together, use is made of a molten material which is solid at room temperature, said molten material being applied ahead of the layer joining rolls, as viewed in the direction in which the layers are introduced between the rolls, to the surface of the liner facing the corrugated medium and/or to the surface of the corrugated medium facing the liner.

---

This invention relates to a method and an apparatus for the manufacture of corrugated board from at least one liner and one corrugated medium or "fluting," which layers are joined together as they pass between rolls rotatable about their longitudinal axes.

The most customary of the previously known methods of manufacturing corrugated board is to adhesively bond a first liner and possibly a second liner to a corrugated medium or fluting. All three layers are passed between two layer joining rolls which urge the layers together. The corrugated board is then introduced into a drying unit in which the adhesive is dried. In view of the time it takes for the adhesive to dry, it is not possible to attain a very high speed of manufacture.

In another previously known method the layers are provided with a meltable coating which is allowed to set. The layers are then brought together between the layer joining rolls while hot air is simultaneously supplied to melt the coating. At the passage between the layer joining rolls the coating again sets and adhesively bonds the layers together. A higher speed of manufacture can be reached with this method which is, however, more circumstantial than conventionally bonding the layers together by means of adhesive. Furthermore, the consumption of meltable wax-like material is relatively great because all layers are to be coated.

The present invention has for its object to provide a simple method of manufacturing corrugated board, which allows a high speed of manufacture and entails a very low consumption of meltable material.

This object is attained in accordance with the present invention by applying ahead of the layer joining rolls, as viewed in the direction in which the layers are introduced between the rolls, a molten material which is solid at room temperature to the surface of the liner facing the fluting and/or to the surface of the fluting facing the liner.

The application can be effected for instance by spraying, spattering, with the aid of engraved rolls or in any other suitable manner whatever.

When introduced between the layer joining rolls, the liner with the liquid molten material thereon is urged against the fluting. The melting point of the material, the spraying temperature and the distance of the spraying point from the gap between the layer joining rolls are readily selected so that setting of the material takes place precisely when the layers are urged together. Should the material set too rapidly the layer joining rolls can be heated, in any case at the beginning of an operating cycle. In this manner the layers are joined together to a unit, whereby a very strong corrugated board is obtained, the layers of which cannot be separated even if the corrugated board becomes moist. Besides, this method permits running at a considerably increased speed of manufacture that what is normal (abt. 150 meters per minute), which yields an appreciably cheaper product than adhesively bonded corrugated board.

All of the layers need not necessarily be melted together in a single station. For instance, one of the liners may have the molten material applied to it in a first station and immediately following upon the application said one liner may be urged against the fluting by a roll which is kept pressed against a per se known toothed roll for forming the fluting, whereupon the second liner has the molten material applied to it in a second station and is urged against the fluting between the layer joining rolls. This makes it possible to use a relatively high pressure for joining the liners in question and the fluting while the latter is on the toothed roll, thereby preventing any deformation whatever of the fluting.

As already mentioned, the corrugated board manufactured by the method suggested by the present invention is partly water-resistant. A complete water resistance may be realized by spraying a water-resistant coating onto the fluting, preferably before the latter is brought into fluted shape, and onto the surfaces of the liners facing away from the fluting, preferably after the liners have passed between the layer joining rolls. If the coating, as mentioned above, is sprayed onto the fluting before the latter is brought into fluted shape, the coating material will be uniformly distributed, which is not as easily attained when the finished fluting is sprayed with the coating material. If the spraying of the coating material onto the liners is performed after the liners have passed between the layer joining rolls, the said rolls will constantly be in contact with non-coated, i.e. clean and dry, surfaces of the liners.

The invention also relates to an apparatus for carrying the above-described method into effect. In this apparatus an applicator unit is arranged on the entry side of the layer joining rolls and serves to apply a molten material which is solid at room temperature to the surface of the liner (or liners) facing the fluting and/or to the surface of the fluting facing the liner (or liners).

An apparatus for manufacturing corrugated board will now be described more in detail in the following with reference to the accompanying drawings in which:

FIG. 1 is a diagrammatic side elevation of the apparatus;

FIG. 2 is a diagrammatic side elevation corresponding to FIG. 1 of a modified apparatus.

The corrugated board is composed of a first liner 1, a second liner 2 and an intermediary layer 3 which is brought into the shape of a fluting 5 by means of two interengaging heated toothed rolls 4.

The first liner 1 and the second liner 2 are passed over two guide rolls 6 to the gap between two layer joining rolls 7 between which the liners 1, 2 are joined to the fluting 5. Joining takes place with the aid of a molten material which is sprayed in molten state by spraying units 8 onto the surfaces of the liners 1, 2 facing the fluting 5 and partly also onto the surfaces of the fluting 5 facing the liners 1, 2.

The individual layers of the corrugated board thus manufactured do not come loose from each other even if the board becomes moist. The manufacture can take place at high speed because the spraying temperature, the melting point of the material sprayed and the spraying point may be so selected that the material sets precisely when the layers pass through the pair of layer joining rolls 7.

The corrugated board manufactured may, however, be made water-resistant to 100% if—as shown in the drawings—a molten material is sprayed onto both sides of the intermediary layer 3 before it is brought into the shape of the fluting 5. This spraying operation is carried out by means of spraying units 9. At the same time the outer surfaces of the finished corrugated board shall be made water-resistant, which is effected by means of spraying units 10 following upon the layer joining rolls 7, as viewed in the direction of motion of the corrugated board. Furthermore, a pair of cooperating smooth rolls 11 are placed after the spraying units 10 to give the two sides of the corrugated board entirely planar and smooth surfaces.

To ensure that the molten material leaving the spraying units 8 is in a molten state when the material impinges on the layers 1, 2 and 5 the spraying units 8 are disposed in a heating chamber 12 in which the air is heated and is kept heated to a temperature suitable for maintaining the material molten by means of electrical, preferably thermostat-controlled resistance elements 13. The heating chamber is defined by walls 14 and the layers 1, 2 and 5.

In the embodiment illustrated in FIG. 2, the application of the molten material takes place in stations. In a first station A, molten material is applied to the liner 1 and the fluting 5 as the latter is being brought into fluted state, and in a second station B molten material is applied to the liner 2 and the fluting 5 formed. In the modified apparatus the intermediary layer 3 is passed over a guide roll 25 before it is moved in between the toothed rolls 4 to be brought into the shape of the fluting 5. FIG. 2 further shows that one toothed roll 4 can serve as one of the layer joining rolls in the pair of such rolls in station A, in which case the initially stated advantages are gained, viz a relatively high joining pressure between a liner and the fluting while the latter is on the toothed roll, thereby preventing any deformation whatever of said fluting.

What I claim and desire to secure by Letters Patent is:

1. Apparatus for manufacturing corrugated board from at least one liner and a fluting comprising a frame, a pair of rotatable joining rolls mounted on said frame for rotation about their longitudinal axes, means for feeding the at least one liner and the fluting along converging paths to pass together between said joining rolls, at least one spraying unit mounted on said frame for directing a spray of molten adhesive material onto the opposed surfaces of the at least one liner and the fluting as said surfaces converge immediately before passing together between said joining rolls, an enclosed chamber preceding said joining rolls and having one wall defined by said joining rolls, said at least one spraying means being disposed within said chamber and means for heating said chamber to a temperature for maintaining the adhesive material in a molten state as it passes from said at least one spray unit to the surfaces of the at least one liner and fluting, said molten adhesive material solidifying as the at least one liner and fluting pass between said joining rolls.

2. Apparatus as claimed in claim 1 wherein said heating means comprises electrical resistance means within said enclosed chamber.

References Cited
UNITED STATES PATENTS

| | | | |
|---|---|---|---|
| 1,199,508 | 9/1916 | Swift, Jr. | 156—205 X |
| 2,972,185 | 2/1961 | Brennan | 117—105.3 X |
| 3,518,142 | 6/1970 | Dooley | 156—205 |

DOUGLAS J. DRUMMOND, Primary Examiner

M. G. WITYSHYN, Assistant Examiner

U.S. Cl. X.R.

156—205

UNITED STATES PATENT OFFICE
CERTIFICATE OF CORRECTION

Patent No. 3,751,325            Dated August 7, 1973

Inventor(s) Ake Evald Edkvist

It is certified that error appears in the above-identified patent and that said Letters Patent are hereby corrected as shown below:

Covering Page, Column 1, In The Heading, After "Ser. No. 67,770" and Before "Int. Cl." insert --claims priority, application Denmark, August 29, 1969, 4643/69--

Signed and sealed this 18th day of December 1973.

(SEAL)
Attest:

EDWARD M. FLETCHER, JR.           RENE D. TEGTMEYER
Attesting Officer                   Acting Commissioner of Patents